(12) United States Patent
Anderson et al.

(10) Patent No.: US 10,878,202 B2
(45) Date of Patent: Dec. 29, 2020

(54) NATURAL LANGUAGE PROCESSING CONTEXTUAL TRANSLATION

(71) Applicant: International Business Machines Corporation, Armonk, NY (US)

(72) Inventors: Evelyn R. Anderson, Houston, TX (US); Kristen Conley, Kieler, WI (US); Martin G. Keen, Cary, NC (US); Natalie Brooks Powell, Bolingbrook, IL (US)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 16/054,400

(22) Filed: Aug. 3, 2018

(65) Prior Publication Data

US 2020/0042602 A1 Feb. 6, 2020

(51) Int. Cl.
| | |
|---|---|
| *G06F 40/58* | (2020.01) |
| *G06F 40/56* | (2020.01) |
| *G10L 15/26* | (2006.01) |
| *G10L 15/18* | (2013.01) |
| *G10L 15/08* | (2006.01) |

(52) U.S. Cl.
CPC .............. *G06F 40/58* (2020.01); *G06F 40/56* (2020.01); *G10L 15/1822* (2013.01); *G10L 15/26* (2013.01); *G10L 2015/088* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/278; G06F 17/2785; G06F 17/2795
USPC .................................................. 704/1, 9, 10
See application file for complete search history.

(56) References Cited

U.S. PATENT DOCUMENTS

| | | | | |
|---|---|---|---|---|
| 8,270,954 | B1 * | 9/2012 | Breau ................... | H04M 3/432 455/414.2 |
| 8,706,486 | B1 * | 4/2014 | Devarajan ........... | G06F 21/6245 704/235 |
| 8,798,995 | B1 * | 8/2014 | Edara ................. | G06Q 30/0255 704/246 |

(Continued)

FOREIGN PATENT DOCUMENTS

EP 2849178 A2 3/2015

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

*Primary Examiner* — Lamont M Spooner
(74) *Attorney, Agent, or Firm* — Richard B. Thomas

(57) ABSTRACT

Ingesting user information from one or more forms of electronic communication. Parsing the ingested user information. Based on the parsed user information, one or more trigger words are determined. Receiving monitored audio of a surrounding environment. Transcribing the monitored audio into a textual format. Parsing the transcribed text. Identifying one or more trigger words. Determining a context of the one or more trigger words. Determining the context satisfies a user criteria. Translating the monitored audio in real-time.

20 Claims, 7 Drawing Sheets

(56) References Cited

U.S. PATENT DOCUMENTS

| | | |
|---|---|---|
| 9,262,935 B2 * | 2/2016 | Nielson .................. G06F 40/205 |
| 9,666,098 B2 * | 5/2017 | Nielson .................. G06F 40/205 |
| 9,747,282 B1 | 8/2017 | Baker et al. |
| 2003/0115059 A1 | 6/2003 | Jayaratne |
| 2004/0138872 A1 | 7/2004 | Nir |
| 2006/0047518 A1 * | 3/2006 | Claudatos ......... H04M 3/42221 |
| | | 704/275 |
| 2006/0080321 A1 * | 4/2006 | Horn ................... G06F 16/9535 |
| 2008/0109222 A1 * | 5/2008 | Liu ..................... G06Q 30/0256 |
| | | 704/246 |
| 2008/0178117 A1 * | 7/2008 | Gelman ............... G06F 3/0481 |
| | | 715/808 |
| 2009/0109961 A1 * | 4/2009 | Garrison ................. H04L 12/66 |
| | | 370/352 |
| 2010/0138416 A1 * | 6/2010 | Bellotti ................. G06F 16/436 |
| | | 707/736 |
| 2011/0078148 A1 * | 3/2011 | Lung .................... G06F 16/319 |
| | | 707/741 |
| 2012/0136648 A1 | 5/2012 | Elliot et al. |
| 2012/0278078 A1 * | 11/2012 | Ricci ....................... G10L 15/22 |
| | | 704/251 |
| 2014/0066105 A1 * | 3/2014 | Bridge .................. G06Q 10/10 |
| | | 455/457 |
| 2014/0222834 A1 * | 8/2014 | Parikh ................ G06F 16/9535 |
| | | 707/748 |
| 2014/0295384 A1 * | 10/2014 | Nielson .................. G06F 40/205 |
| | | 434/157 |
| 2014/0297266 A1 * | 10/2014 | Nielson .................. G06F 40/205 |
| | | 704/9 |
| 2014/0342320 A1 * | 11/2014 | Nielson ................... A61B 5/165 |
| | | 434/156 |
| 2014/0342323 A1 * | 11/2014 | Nielson ................... A61B 5/048 |
| | | 434/169 |
| 2016/0163228 A1 * | 6/2016 | Nielson ................... A61B 5/165 |
| | | 704/9 |
| 2016/0336008 A1 | 11/2016 | Menezes et al. |
| 2016/0364381 A1 * | 12/2016 | Brown .................... G06F 40/35 |
| 2016/0379633 A1 * | 12/2016 | Lehman .................. G10L 15/22 |
| | | 704/275 |
| 2017/0149795 A1 * | 5/2017 | Day, II ................ G06F 21/6218 |
| 2017/0269899 A1 * | 9/2017 | Spiessbach ........... G06F 40/169 |
| 2017/0278519 A1 * | 9/2017 | Visser ...................... G01S 5/18 |
| 2017/0279859 A1 * | 9/2017 | Pogorelik ............. G06F 3/0482 |
| 2018/0032612 A1 * | 2/2018 | Kariman ............. G06F 16/164 |
| 2018/0070389 A1 * | 3/2018 | Morgan ..................... G09G 5/12 |
| 2018/0121034 A1 * | 5/2018 | Baker .................... G06Q 50/01 |
| 2018/0218734 A1 * | 8/2018 | Somech ................ G10L 15/005 |
| 2018/0246983 A1 * | 8/2018 | Rathod ............... G06F 16/9535 |
| 2018/0293221 A1 * | 10/2018 | Finkelstein ........... G06F 40/205 |
| 2019/0033043 A1 * | 1/2019 | Piccioni .................. A45F 5/021 |
| 2019/0156821 A1 * | 5/2019 | Zamora Duran ....... G10L 15/30 |
| 2019/0206395 A1 * | 7/2019 | Aoki ....................... G10L 15/30 |
| 2019/0272321 A1 * | 9/2019 | Harari ................... G06F 40/279 |
| 2019/0311718 A1 * | 10/2019 | Huber ................... G06F 3/0304 |
| 2019/0355391 A1 * | 11/2019 | Zavesky ................. G11B 27/28 |

* cited by examiner

NATURAL LANGUAGE PROCESSING CONTEXTUAL TRANSLATION

BACKGROUND

The present disclosure relates generally to the field of data processing, and more particularly to data processing based on a user profile or attribute.

Natural language processing is an area of computer science, specifically artificial intelligence, that utilizes computer technology to process large amounts of natural language data. The natural language data includes, but is not limited to, textual data, audio data, and video data. A natural language processor can translate the speech to text, parse the text, and then break the text into its substituent components for analysis.

SUMMARY

Embodiments of the present invention disclose a method, computer program product, and system for dynamically utilizing natural language processing to display real-time translations. The method includes ingesting user information from one or more forms of electronic communication. The method includes parsing the ingested user information. Based on the parsed user information, one or more trigger words are determined. The method includes receiving monitored audio of a surrounding environment. The method includes transcribing the monitored audio into a textual format. The method includes parsing the transcribed text. The method includes identifying one or more trigger words. The method includes determining a context of the one or more trigger words. The method includes determining the context satisfies a user criteria. The method includes translating the monitored audio in real-time.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

It is to be understood that the advantages are example advantages and should not be construed as limiting. Embodiments of the present disclosure can contain all, some, or none of the advantages while remaining within the spirit and scope of the present disclosure.

This disclosure addresses the problem of a person's inability to speak or understand a foreign language being spoken by one or more persons, or a group of people. By allowing an electronic device (e.g., a smart phone, smart tablet, laptop, wearable smart device, and the like) to detect certain trigger words within nearby conversations spoken in a foreign language and then provide a translation of the conversation, the user may be able to intelligently interact with the speaker. In addition, the user may not miss out on important information (e.g., in a business meeting and/or conference) that is relevant to his or her work.

In situations with multiple concurring conversions, such as within a break room, a convention hall, or any public place, it is not practical to translate and follow all conversations. There are too many conversations to follow making it impractical to perform a single translation, and it is impractical for a user to follow along with a transcript of all the conversations. Embodiments of the present disclosure describe a method that records audio data, translates the audio data to text, parses the text utilizing natural language processing, identifies key words included in the text and based on a user criteria, and then translates only those conversation snippets that are of interest to the user. The user may decline or accept the translated text and be notified of where in a room the conversation is being held. This may be useful for when the user is not currently speaking in a group where the relevant conversation is being held, but would like to engage, or discuss the topic, with the speaker at a later time. Embodiments of the present disclosure receive a confirmation or consent of all parties prior to collecting their audio data.

Figure 1:
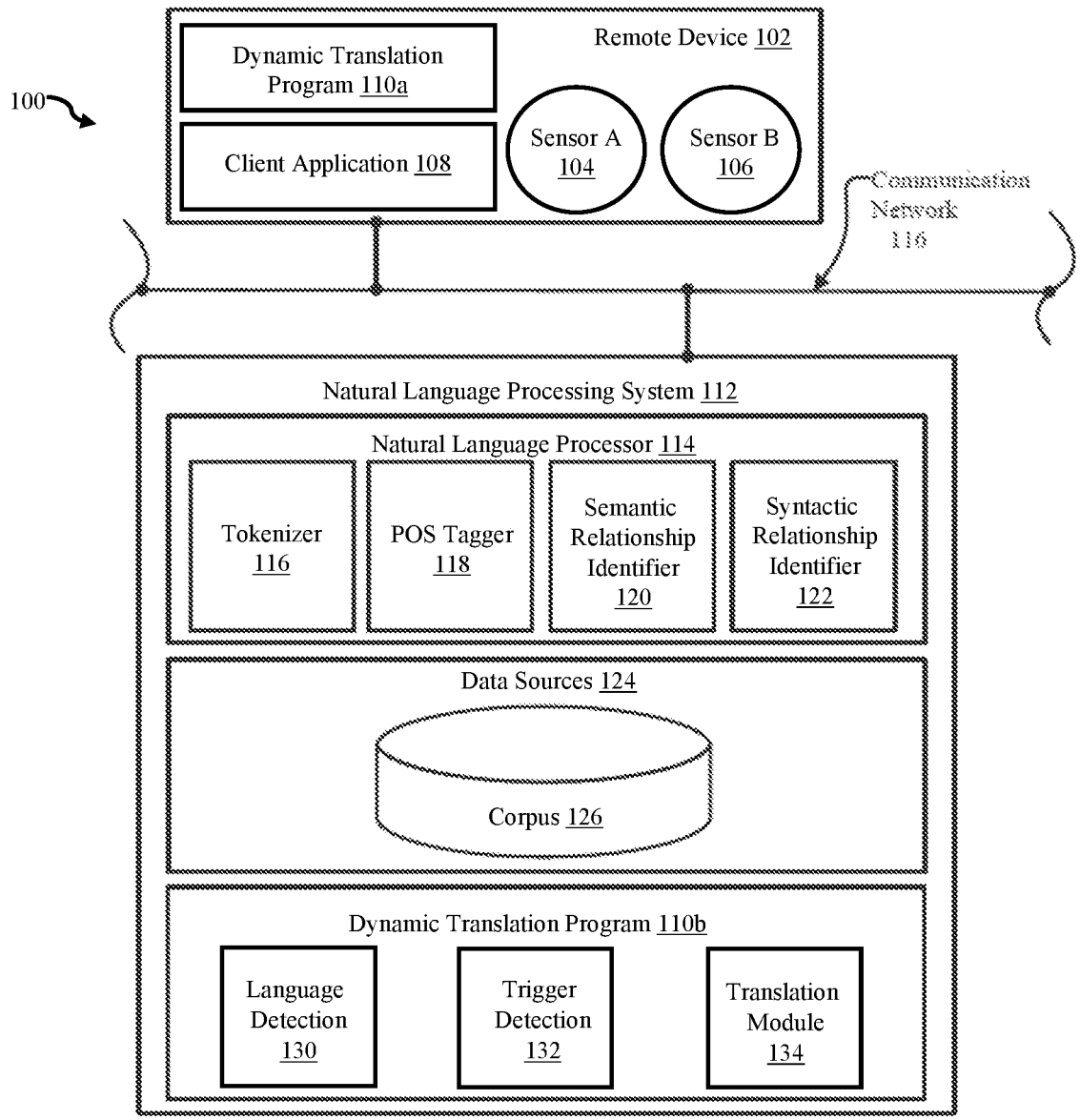
FIG. 1 illustrates a block diagram of an example remote device and natural language processing system configured to analyze content within a social networking system and to display a real-time translation, according to at least one embodiment.

Referring now to FIG. 1, shown is a block diagram of an exemplary system architecture 100, including a remote device 102 and a natural language processing system 112, configured to analyze ingested electronic communication from one or more forms of social networking systems, and to parse transcribed text of monitored audio, to determine trigger words based on the ingested electronic communication and to identify the trigger words within the transcribed text and a context surrounding the trigger words, in accordance with embodiments of the present disclosure. In some embodiments, the remote device 102 may be a smart phone, a smart tablet, a desktop computer, a laptop, or any other electronic device capable of transmitting and receiving data. In some embodiments, the remote device 102 may include a sensor A 104, a sensor B 106, a client application 108, and a dynamic translation program 110a. Both sensor A 104 and sensor B 106 may each be a microphone, a digital camera, etc., and may be embedded within the remote device 102, or external and communicatively coupled to the remote device. These sensors 104, 106 may monitor the audio or video content in a surrounding area within a predetermined proximity of a user. The surrounding area may be a building and the predetermined proximity may be any distance that is within the capability of the sensors 104, 106 (e.g., ten feet, twenty feet, etc.). Further, the user may determine the proximity and manually input the determined proximity into the client application 108. In some embodiments, the proximity may be automatically determined based on historical user preferences. The dynamic translation program 110a may display transcribed text within a user interface of the remote device 102.

The remote device 102 may submit electronic documents (such as electronic messages of one or more social networking systems) to be analyzed by the natural language processing system 112 which may be housed on a host device (not shown). The social networking systems may include corporate email accounts, personal email accounts, blogs, threads, etc. In some embodiments, a second remote device (not shown) may submit other electronic content (such as content displayed on the one or more social networking systems) to be analyzed to the natural language processing system 112. In addition, the remote device may select targeted electronic documents based on a particular event. For example, if the user is attending a conference, the remote device may submit electronic documents (e.g., a report, peer reviewed article, power point, a resume etc.) that are related to the event. The user may manually submit such relevant electronic documents into the remote device 102. Such remote devices may each include a client application 108, which may itself involve one or more entities operable to generate or modify content from a social networking system or other electronic communication that is then dispatched to the natural language processing system 112 via a network 116.

Consistent with various embodiments, the natural language processing system 112 may respond to content submissions sent by the client application 108. Specifically, the natural language processing system 112 may analyze a received content from a social networking system or other received electronic communication content to identify characteristics about the received content (e.g., keywords, events, projects, and/or titles of messages). In some embodiments, the natural language processing system 112 may include a natural language processor 114, and data sources 124. The natural language processor 114 may be a computer module that analyzes the received content. The natural language processor 114 may perform various methods and techniques for analyzing the received content (e.g., syntactic analysis, semantic analysis, etc.). The natural language processor 114 may be configured to recognize and analyze any number of natural languages. In some embodiments, the natural language processor 114 may parse passages of the received content. Further, the natural language processor 114 may include various modules to perform analyses of the received electronic documents. These modules may include, but are not limited to, a tokenizer 116, a part-of-speech (POS) tagger 118, a semantic relationship identifier 120, and a syntactic relationship identifier 122.

In some embodiments, the tokenizer 116 may be a computer module that performs lexical analysis. The tokenizer 116 may convert a sequence of characters into a sequence of tokens. A token may be a string of characters included in written passage and categorized as a meaningful symbol. Further, in some embodiments, the tokenizer 116 may identify word boundaries in content and break any text passages within the content into their component text elements, such as words, multiword tokens, numbers, and punctuation marks. In some embodiments, the tokenizer 116 may receive a string of characters, identify the lexemes in the string, and categorize them into tokens.

Consistent with various embodiments, the POS tagger 118 may be a computer module that marks up a word in passages to correspond to a particular part of speech. The POS tagger 118 may read a passage or other text in natural language and assign a part of speech to each word or other token. The POS tagger 118 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed content (e.g., the content of message may shed light on the meaning of text elements in related messages, or content of a first message by the user on a social networking system may shed light on meaning of text elements of a second message by that user on the same or different social networking system). Examples of parts of speech that may be assigned to words include, but are not limited to, nouns, verbs, adjectives, adverbs, and the like. Examples of other part of speech categories that POS tagger 118 may assign include, but are not limited to, comparative or superlative adverbs, wh-adverbs, conjunctions, determiners, negative particles, possessive markers, prepositions, wh-pronouns, and the like. In some embodiments, the POS tagger 118 may tag or otherwise annotate tokens of a passage with part of speech categories. In some embodiments, the POS tagger 118 may tag tokens or words of a passage to be parsed by the natural language processing system 112.

In some embodiments, the semantic relationship identifier 120 may be a computer module that may be configured to identify semantic relationships of recognized text elements (e.g., words, phrases) in received content. In some embodiments, the semantic relationship identifier 120 may determine functional dependencies between entities and other semantic relationships.

Consistent with various embodiments, the syntactic relationship identifier 122 may be a computer module that may be configured to identify syntactic relationships in a passage composed of tokens. The syntactic relationship identifier 122 may determine the grammatical structure of sentences such as, for example, which groups of words are associated as phrases and which word is the subject or object of a verb. The syntactic relationship identifier 122 may conform to formal grammar.

In some embodiments, the natural language processor 114 may be a computer module that may parse received content and generate corresponding data structures for one or more portions of the received content. For example, in response to receiving correspondence from a social networking system at the natural language processing system 112, the natural language processor 114 may output parsed text elements from the correspondence as data structures. In some embodiments, a parsed text element may be represented in the form of a parse tree or other graph structure. To generate the parsed text element, the natural language processor 114 may trigger computer modules 116-122.

In some embodiments, the output of natural language processor 114 (e.g., ingested content from one or more social networking systems) may be stored within data sources 124, such as corpus 126. As used herein, a corpus may refer to one or more data sources, such as the data sources 124 of FIG. 1. In some embodiments, the data sources 124 may include data warehouses, corpora, data models, and document repositories. In some embodiments, the corpus 126 may be a relational database. Statistical analysis may be performed on the content stored within the corpus to determine, e.g., a frequency of trigger words.

In some embodiments, the output of natural language processor 114 (e.g., ingested content from one or more social networking systems) may be transmitted to a dynamic translation program 110b. The dynamic translation module 110b may include a language detection module 130, a trigger detection module 132, and a translation module 134. In some embodiments, the language detection module 130 may determine the type of language being spoken. For example, the language being spoken may be English, German, Russian, etc. This may be compared to a stored list of languages within the language detection module 130, which may be stored according to the user's understanding or fluency of the spoken language. A confidence level may be associated with the user's understanding or fluency of the spoken language. For example, the languages may be organized according to how likely the user will be able to converse in the spoken language. The stored list may also include languages spoken by coworkers or friends who are within a proximity of the user. This information may be obtained from the natural language processing of the social networking systems or the user may manually enter the languages along with a confidence level of each language. Based on the comparison of the determined language being spoken and the list of languages, a note may be created so that the user may know if the spoken language matches any of the languages within the list, so that he or a coworker—who may be included in the note displayed within the user interface of the remote device 102—may be able to carry on a conversation in the spoken language.

The trigger detection 132 may detect trigger words within the content outputted from the natural language processor 114. In addition, the trigger detection module may detect trigger within transcribed text of a spoken language detected by the language detection module. The detected trigger module may include a table that includes a plurality of trigger words that are in a plurality of languages. For example, if the trigger word is "table," then the word table may be stored in the table in English, Russian, Chinese, etc. In addition, the trigger words may be stored according to their language. If the language detection module 130 detects the spoken language to be Chinese, then the trigger detection module may query the stored table to access the portion of trigger words within the table that are in Chinese.

The detected trigger words may be synonyms or antonyms of the trigger words, or may be substantial variants thereof. For example, if a trigger word is country, the trigger detection module 132 may detect words such as nation, state, continent, and the like. The trigger detection module 132 may determine, based on the context of the detected word determined by the POS tagger 118, whether the detected word satisfies a threshold. This may occur whether the detected word is a synonym, antonym, substantially similar, or exact match of a trigger word. The detected word may be given a weight—depending on a strength of context. For example, the detected word is an exact match, the detected word may be weighted higher than if the detected word is an antonym that is out of context. A detected word with higher weight may be selected as a trigger word over a detected word with a lower weight.

In some embodiments, the translation module 134 may transcribe the spoken language into a language that the user is familiar with. The language may be predetermined and/or manually entered by the user. The translation module 134 may also determine the language of the transcribed text according to the processed social networking content or based on historical data. The translation module 134 may transmit this transcribed text to the dynamic translation module 110a to be displayed within the user interface of the remote device 102.

Figure 2:
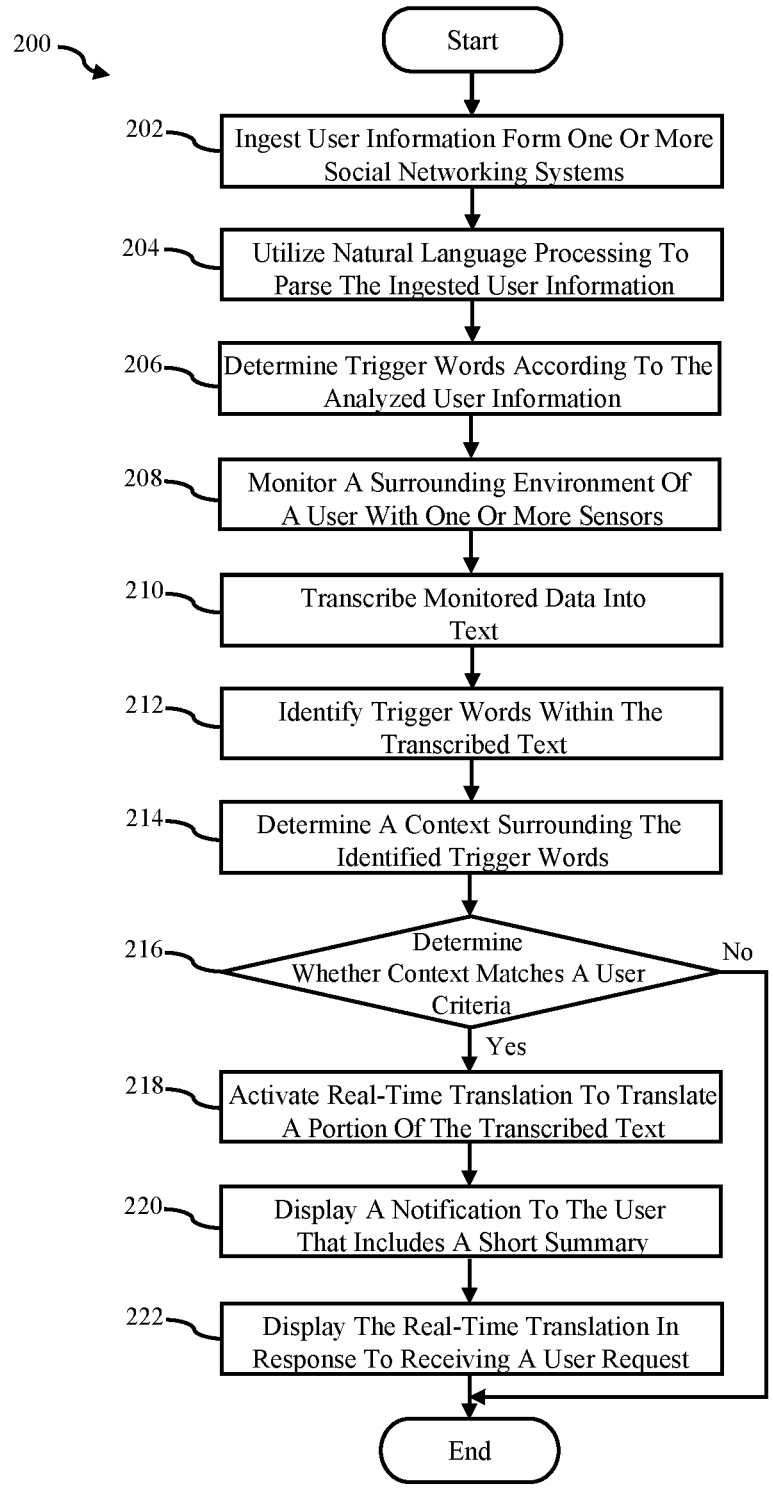
FIG. 2 illustrates an operational flowchart illustrating an example translation process by a dynamic translation program, according to at least one embodiment.

Referring now to FIG. 2, an operational flowchart illustrating an exemplary dynamic translation process 200, according to at least one embodiment, is depicted. At 202, the client application 108 ingests user information from one or more social networking systems. The one or more social networking systems may include work or personal social networking systems. For example, the work social networking systems may include a corporate email, a corporate social networking system where the user has an employee profile, or a corporate messaging platform, a corporate calendar that lists important events, and the like. The personal networking system may include any social networking accounts where the user messages friends, acquaintances, or other social networking users, on blogs, threads, and the like. The social networking systems, both personal and work related, may include any form of data (e.g., text, audio recordings, video recordings, etc.).

At 204, a natural language processor, e.g. natural language processor 114, parses the ingested user information. The ingested user information may be substantially similar to as described above, with reference to FIG. 1. This parsed user information may be utilized to construct a user profile that is organized according to hobbies, activities, events, interests, etc. In addition, the natural language processor may generate corresponding data structures for one or more portions of the user information. For example, the natural language processor 114 may output parsed text elements from the social networking systems as data structures. Additionally, a parsed text element may be represented in the form of a parse tree or other graph structure. The natural language processor 114 may also parse audio and video recordings within the user information.

The outputted text elements may be any words in the form of text, audio, or video that appears more than once or have a relative importance to the user selected messages (e.g., the message date, title, sender, receiver, and/or frequently used words). The text elements may be a concept within the text of the user information or within an audio and video recording within the user information. The parsed text elements or keywords of the user selected messages may be included more than once and may be a different font (e.g., larger than other words within the user information), presented in a different manner than other words within the user information (e.g., bolded or in italics), or be in different formats (e.g., PDF, .doc, jpeg, etc.). Additionally, the text element and/or keywords may be listed in a table for visual view ability for the user. The table may be ordered based on user pre-configuration (e.g., most important to least important).

Next, at 206, the natural language processor 114 determines one or more trigger words according to the parsed user information. According to at least one embodiment, the natural language processor 114 may determine the one or more trigger words by executing entity resolution techniques that may determine important entities within the parsed user information. Entity resolution techniques may identify concepts and keywords within the user information. Once entities have been identified, correlations and linguistic links between entities may be detected and used to establish relevance of the entities and, ultimately, the context of the user information. An example technique that may be useful in determining the relative importance of a given entity to the context of the passage is inverse document frequency, which utilizes the relative commonality of the entity as an indicator of its importance to evaluating context. Many other techniques may also be used. These same techniques may be utilized to determine the main idea or critical words of the user information.

According to some embodiments, the natural language processor 114 may generate a knowledge graph for the user information. The knowledge graph may have the same or similar characteristics and/or appearance as the knowledge graph that will be discussed in reference to FIG. 3. For example, the knowledge graph may include a plurality of nodes and edges. The nodes may relate to concepts found in the user information, such as keywords, message titles, audio/video titles, and/or who is receiving/transmitting the correspondence. The nodes may be linked together with edges to represent a connection between the nodes. The knowledge graph will be discussed in further detail with reference to FIG. 3.

The natural language processor 114 may, in part, weight links (e.g., each link has a weight of one) of the knowledge graph, as well as parsed text elements and/or keywords within the user information. Weighting may occur in instances when there are multiple identified text elements and/or keywords that are not relevant but appear multiple times within the parsed user information. For example, if the unrelated text elements and/or keywords are "overhead" and "revenue," and the unrelated determined topics appear multiple times throughout the user information, each unrelated determined topic may be weighted to determine which topic more accurately describes the content of the ingested user information. The natural language processor 114 may weigh each text element and/or keyword according to the number of appearances within the user information, according to the location within the user selected messages (e.g., in the title), according to who delivered or received correspondence (e.g., if an email was delivered to a fourth-line manager), etc. The value of the weights given to the text elements and/or keywords may be adjusted by the user or automatically by the natural language processor 114. Then, at 208, one or more sensors monitor a surrounding area within a proximity of a user. This may be accomplished by one or more sensors (e.g., sensor A 104 and sensor B 106) receiving audio data from one or more sources (e.g., a group of people conversing or someone presenting) within a building where the user is located. The received audio data is from people who have consented to have their audio data monitored. The one or more sensors may each be a microphone, a digital camera, etc.

The user may determine the proximity and manually input the determined proximity into the client application 108. The proximity may be automatically determined based on historical user preferences. The predetermined proximity may be any distance that is within the capability of the sensors 104, 106 (e.g., ten feet, twenty feet, etc.). The one or more sensors may be able to determine, based on time of receiving the audio and a spatial relation between each of the sensors, a geographic location of a source of the received audio. In some embodiments, the one or more sensors may implement time difference of arrival (TDOA) or triangulation, whereby the time difference of arrival of multiple audio data collected by multiple microphones—each at different physical locations—is calculated to determine the source of the audio. Further, the location can be determined utilizing the one or more sensors to receive the monitored audio by cross referencing the timing of the received audio data.

Then, at 210, the translation module 134 transcribes the monitored data into a textual format. The translation module 134 may transcribe the spoken language into a language that the user is familiar with. For example, this may include transcribing according to the user's language (e.g., English, Russian, Spanish, etc.), and further according to a type of speech (e.g., a particular dialect) that the user is familiar with. This may be predetermined and/or manually entered by the user, or based on the parsed user information.

Then, at 212, the trigger detection module 130 identifies one or more trigger words within the transcribed text. The one or more identified trigger words may not be exact matches of the trigger words. For example, the one or more identified trigger words may be antonyms, synonyms, abstractions, words commonly associated with the trigger words, or variants thereof. For example, if the trigger word is plane, then words such as aircraft, jet, and blimp may be identified. In addition, if the trigger word is a particular state, such as Minnesota, then other states, such as California and Oregon, may be identified. Similarly, if the trigger word is a particular country, such as Argentina, then other countries, such as Bolivia and Guatemala, may be identified. As another example, if the trigger word is Alice, and the user commonly discusses the word Alice with Abstract in the ingested correspondence (user information), the word Abstract may be identified. The one or more trigger words—along with antonyms, synonyms, relevant words, and the like—may be stored in the corpus 126 in the form of a table. The corpus 126 may be referenced when identifying a trigger word—by referencing the table. The table can be built by the remote device 102 submitting electronic documents from online databases—dictionaries, thesauruses, encyclopedias—to find synonyms, antonyms, and the like.

Then, at 214, the natural language processor 114 determines a context surrounding the identified one or more trigger words. This may be done in a substantially similar manner as in 206. For example, the natural language processor 114 may determine the context by executing entity resolution techniques that may determine important entities within the transcribed text that are surrounding the identified trigger words. Entity resolution techniques may identify concepts and keywords within the transcribed text that are surrounding the identified trigger words. Once entities have been identified, correlations and linguistic links between entities may be detected and used to establish relevance of the entities and, ultimately, the context of the identified trigger words. Inverse document frequency, which utilizes the relative commonality of the entity as an indicator of its importance to evaluating context, may be utilized.

According to some embodiments, the natural language processor 114 may generate a knowledge graph for the transcribed text and may focus on a proximity of the transcribed text surrounding the identified trigger words. The knowledge graph may have the same or similar characteristics and/or appearance as the knowledge graph that will be discussed in reference to FIG. 3. For example, the knowledge graph may include a plurality of nodes and edges. The nodes may relate to concepts found in the transcribed text. The nodes may be linked together with edges to represent a connection between the nodes. The knowledge graph will be discussed in further detail with reference to FIG. 3.

The natural language processor 114 may, in part, form the assessment by weighting links (e.g., each link has a weight of one) of the knowledge graph, as well as transcribed text elements and/or keywords within the transcribed text. Weighting may occur in instances when there are multiple identified text elements and/or keywords that are not relevant but appear multiple times within the transcribed text. The natural language processor 114 may weigh each text element and/or keyword according to the number of appearances within the transcribed text. The value of the weights given to the text elements and/or keywords may be adjusted by the user or automatically by the natural language processor 114.

Then, at 216, the natural language processor 114 determines whether the determined context satisfies a user criteria. The user criteria may depend, in part, on a particular event, time of day, geographic location, or any information ingested from the social networking system. For example, if a particular work event is listed as important on an ingested social networking system, then the particular work event may be included in the user criteria. Additionally, if a presentation topic that the user was presenting is included in the social networking system, then the presentation topic may be included in the user criteria. Similarly, if the ingested information included company acquisition information, company restructuring, company goals or targets, a particular city where the company is constructing a building, a particular market that the company is considering exploring, and the like, these topics may be added to the user criteria. Satisfying the user criteria may include exact, substantially similar, antonyms, and/or synonyms of the identified trigger words with the selected words comprising the user criteria. If the processor determines that the determined context satisfies a user criteria (216, "YES" branch), the dynamic translation process 200 may activate a real-time translation to translate a portion, or all, of the transcribed text at 218. If the processor determines that the determined context does not satisfy a user criteria (216, "NO" branch), the dynamic translation process 200 may continue (repeat the dynamic translation process starting again from 202) to monitor audio data of the surrounding environment, or terminate.

If the processor determines the context satisfies the user criteria, then the translation module 134 activates a real-time translation to translate a portion of the transcribed text at 218. The real-time translation is of the received audio that includes the trigger words. The one or more sensors (e.g., sensor A and sensor B 104, 106) will continue to receive the monitored audio in the surrounding environment and will continue to determine the geographic location of the source of the received audio. In some embodiments, Fast Fourier Transform (FFT) may be utilized to track the source of the received audio, when there are multiple speakers in a surrounding environment, or if the surrounding environment has background noise. In addition, the one or more sensors may filter the received audio to block out some, or all, background noise in the surrounding environment.

Figure 4:
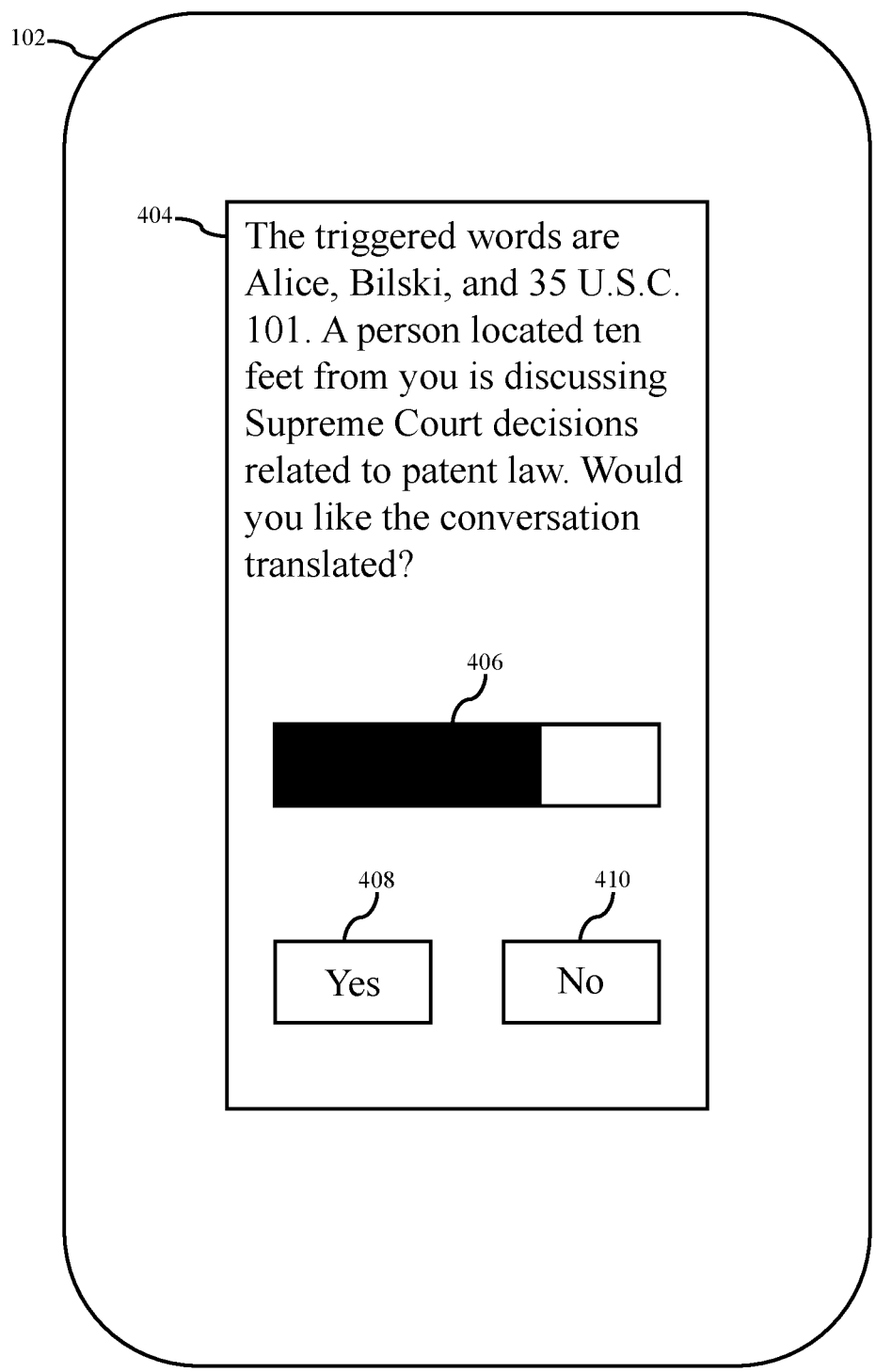
FIG. 4 illustrates an exemplary display of a user notification indicating that a trigger word has been identified within a surrounding environment, according to at least one embodiment.

Once the translation module 134 activates a real-time translation, the dynamic translation process 200 may proceed to 220 to display a notification to the user that includes a short summary. The notification may be substantially similar to what is depicted in FIG. 4. The short summary may include a snippet of the transcribed text or may include a summary generated by the natural language processor 114. In addition, the notification may include the location of source of the received audio, an indication of the confidence level of the trigger word and its context, and the language of the received audio, which will be discussed with reference to FIG. 4. In response to receiving a request from the user to display the real-time translation, at 222, the dynamic translation program 110a may display the real-time translation. In some embodiments, the dynamic translation program 110a may output the real-time translation an audio format.

Figure 3:
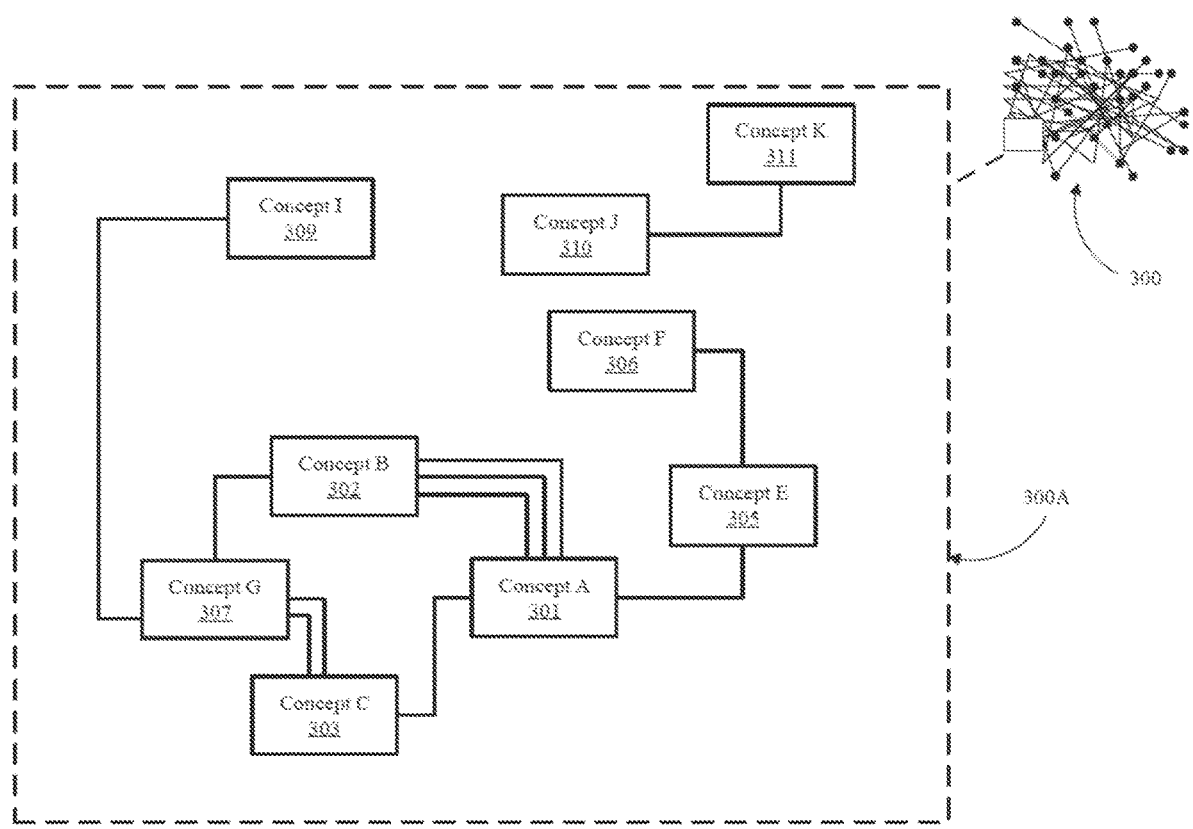
FIG. 3 illustrates a close-up view of a portion of an exemplary knowledge graph for the one or more trigger words and content within a social networking system, according to at least one embodiment.

FIG. 3 illustrates a close-up view of a portion 300A of an exemplary knowledge graph 300 for the one or more trigger words and the user information, in accordance with embodiments of the present disclosure. The same technique described with reference to the parsed received audio once the trigger words have been identified within the transcribed text; however, for simplicity, the majority of this discussion will focus on utilizing the knowledge graph to analyze the ingested user information. The close-up view of the portion 300A includes eleven nodes 301-311, with each node representing a different concept (e.g., trigger word). For example, a node may represent a title, addressee, event, key word, and/or main idea of the parsed user information according to a user criteria. For example, a node may represent a trigger word, or a particular correspondence within a social networking system. The nodes 301-311 are connected by edges that represent connections between the correspondences. For example, if two connected correspondences correspond to an event or an ongoing project, an edge connecting them may represent a link for the event or the project. There may be two links connecting them, a first link representing the event, and a second link representing the project. A processor (e.g., natural language processor 114) may generate the knowledge graph 300 using known natural language processing techniques. The illustrated portion 300A of the knowledge graph 300 is an undirected part of the knowledge graph, meaning that the edges shown represent symmetric relations between the concepts. If, however, an edge presented a different relationship, the edge may be a directed edge.

The number of edges connecting two concepts may correspond to a level of relatedness between the concepts. For example, concept A 301, which may correspond to a trigger word (e.g., a first concept), and concept B 302, which may correspond to a correspondence within a social networking system (e.g., a comment within the social networking system), are connected with three edges, whereas concept A 301 is connected to concept E 305, which may correspond to a similar sender of correspondence, by a single edge. This may indicate that concept A 301 and concept B 302 are more closely related than concept A 301 and concept E 305. As an additional example, concept C 303 may correspond to correspondence within an inbox folder (e.g., of a corporate email account) and concept G 307 may correspond to correspondence within a sent folder (e.g., of the corporate email account), and are connected with two edges. The two edges between concept C 303 and concept G 307 may represent a title of a message and a key term. A processor (e.g., natural language processor) may assign a numerical value for two concepts based on the number of edges connecting the two concepts together.

The numerical value may also consider the relatedness of concepts that, while not directly connected to each other in the knowledge graph 300, are each connected to the same concept. The processor may look at whether an event or key term linking two edges can be taken through other concepts to connect the two concepts. For example, an event can be drawn to connect concept A 301 and concept F 306 by going through concept E 305, which may correspond to a project that is included in both concept A 310 and concept F 306. The length of the path may be considered when determining a numerical value (i.e., user criteria) between two concepts. For example, the numerical value may be based on the degrees of separation between concepts. Two concepts that are linked together (e.g., concept A 301 and concept B 302) may have 1 degree of separation, whereas two concepts that are not linked together but are both linked to a third concept (e.g., concept A 301 and concept F 306) may have 2 degrees of separation, for example. Additionally, the numerical value can be inversely related to the number of degrees of separation.

The processor may also consider the number of other concepts that the two concepts are connected to in determining a numerical value. For example, concept G 307 is not connected by an edge to concept A 301. However, concept G 307 and concept A 301 are both connected to concepts C 303 and B 302. The processor may determine that, despite not being directly connected, concepts G 307 and A 301 are somewhat related. Accordingly, the numerical value between concepts G 307 and A 301 may be higher than the numerical value between concept A 301 and concept I 309, which are distantly connected to each other, or than concept A 301 and concept K 311, which cannot be connected.

The illustrated portion 300A of the knowledge graph 300 has two connected components. A connected component of an undirected graph includes a subgraph in which any two nodes in the subgraph are connected to each other by paths (including paths through other nodes), but cannot be connected to at least one other node in the graph. For example, concept K 311 and concept J 310 are connected to each other, but no path exists in the illustrated portion 300A of the knowledge graph 300 that can connect either concept K 311 or concept J 310 to concept I 309. Likewise, any two nodes that represent concepts A through I 301-309 can be connected to each other by at least one path, but none of the nodes representing concepts A through I 301-309 can be connected to either concept J 310 or concept K 311. Because there are two subgraphs that satisfy this criteria, the illustrated portion 300A of the knowledge graph 300 includes two connected components.

The knowledge graph 300 (or a portion thereof) may have an isolated node (i.e., an orphan generation). An isolated node includes a node relating to a concept that does not connect to any other nodes through an edge. Isolated nodes may be particularly likely to exist in knowledge graphs generated for correspondences (e.g., trigger word, message of a corporate email account, and/or synthetic message) mentioned only briefly (e.g., in a single message). An isolated node is a type of connected component.

The nodes 301-311 may be generated using "fuzzy logic" and/or concept matching, which may be done to ensure that different words or phrases relating to the same concept are included in a single node (e.g., if an event's title changes throughout an activity stream). Fuzzy logic is a technique that may represent different representations of an event or concept as a same entity. For example, the trigger word may refer to an event's "title," "Ceremony," and "Banquet" at different points. The natural language processing techniques and fuzzy logic may determine that all three words refer to the same concept. Accordingly, all three terms may be represented in the knowledge graph using a single node and any edges between any of the three terms and other concepts may connect to that node.

The nodes 301-311 can be weighted according to their importance. This may be represented in the knowledge graph 300 by making the nodes 301-311 larger or smaller. The nodes 301-311 may be weighted according to the number of edges that connect to the nodes. The nodes 301-311 may be weighted according to the importance of the associated concept. For example, correspondences within ingested user information that include an important project may be weighted more than concepts relating to events (e.g., lunch and/or party). Also, at least one topic previously used by the user may be weighted more heavily.

One or more of the nodes 301-311 may be considered potentially important nodes. This may be represented in the knowledge graph by making the potentially important nodes larger, smaller, or boldface type. A node may be a potentially important node if it has a high number of edges connecting to it. For example, the processor may determine that a node is a potentially important node by comparing the number of edges connected to the node to an important node threshold. The important node threshold may be configured by a user. The important node threshold may be determined by the processor based on the number of edges connected to each node. For example, the processor may determine that 10% of nodes in the knowledge graph have more than 20 edges connected to them. Accordingly, the processor may set the important node threshold at 20 edges. Therefore, any node with more than 20 connected edges may be considered a potentially important node.

Now turning to FIG. 4, an example notification within a display of the user interface of the remote device is depicted, according to various embodiments. The remote device 102 may include a user interface 404 that includes a short summary of the received audio. The user interface may include an indication of the confidence level 406 trigger words and its context. The display may further include a "yes" option 408 and a "no" option 410. If the user selects the "yes" option 408, the real-time activation may begin to display translated text of the recorded audio. If the user selects the "no" option 410, the notification may disappear.

It may be appreciated that FIGS. 1-4 provide only an illustration of one embodiment and do not imply any limitations with regard to how different embodiments may be implemented. Many modifications to the depicted embodiment(s) may be made based on design and implementation requirements.

Figure 5:
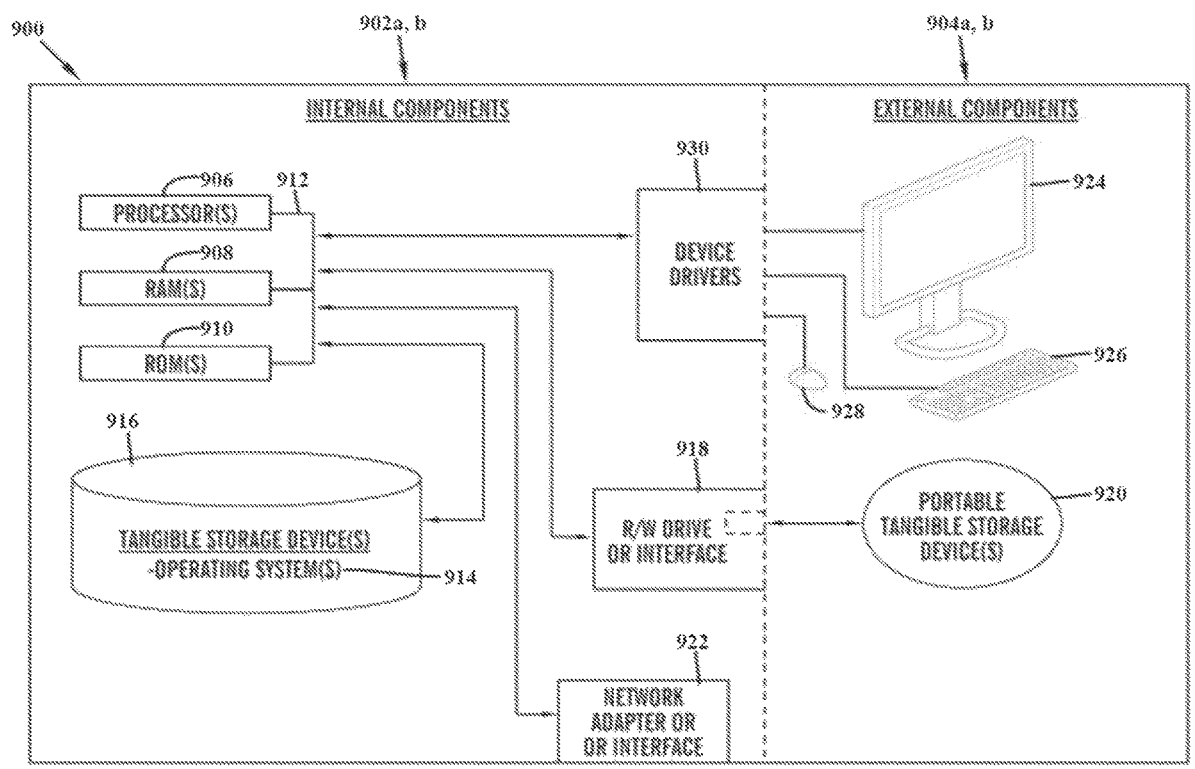
FIG. 5 is a block diagram of internal and external components of the remote device and natural language processing system depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902*a*, *b*, and 904, b is representative of any electronic device capable of executing machine-readable program instructions. Data processing system 902*a*, *b*, and 904, b may be representative of a smart phone, a computer system, PDA, or other electronic devices. Examples of computing systems, environments, and/or configurations that may represented by data processing system 902*a*, *b*, and, 904 *a*, *b* include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Remote device 102 and natural language processing system 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the dynamic translation programs 110 a, b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The dynamic translation programs 110 a, b in remote device 102 and the natural language processing system 112, respectively, can be downloaded from an external computer (e.g., server) via a network (for example, the Internet, a local area network or other, wide area network) and respective network adapters or interfaces 922. From the network adapters (or switch port adaptors) or interfaces 922, and both the dynamic translation programs 110 a, b in remote device 102 and the natural language processing system 112, respectively, are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in tangible storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
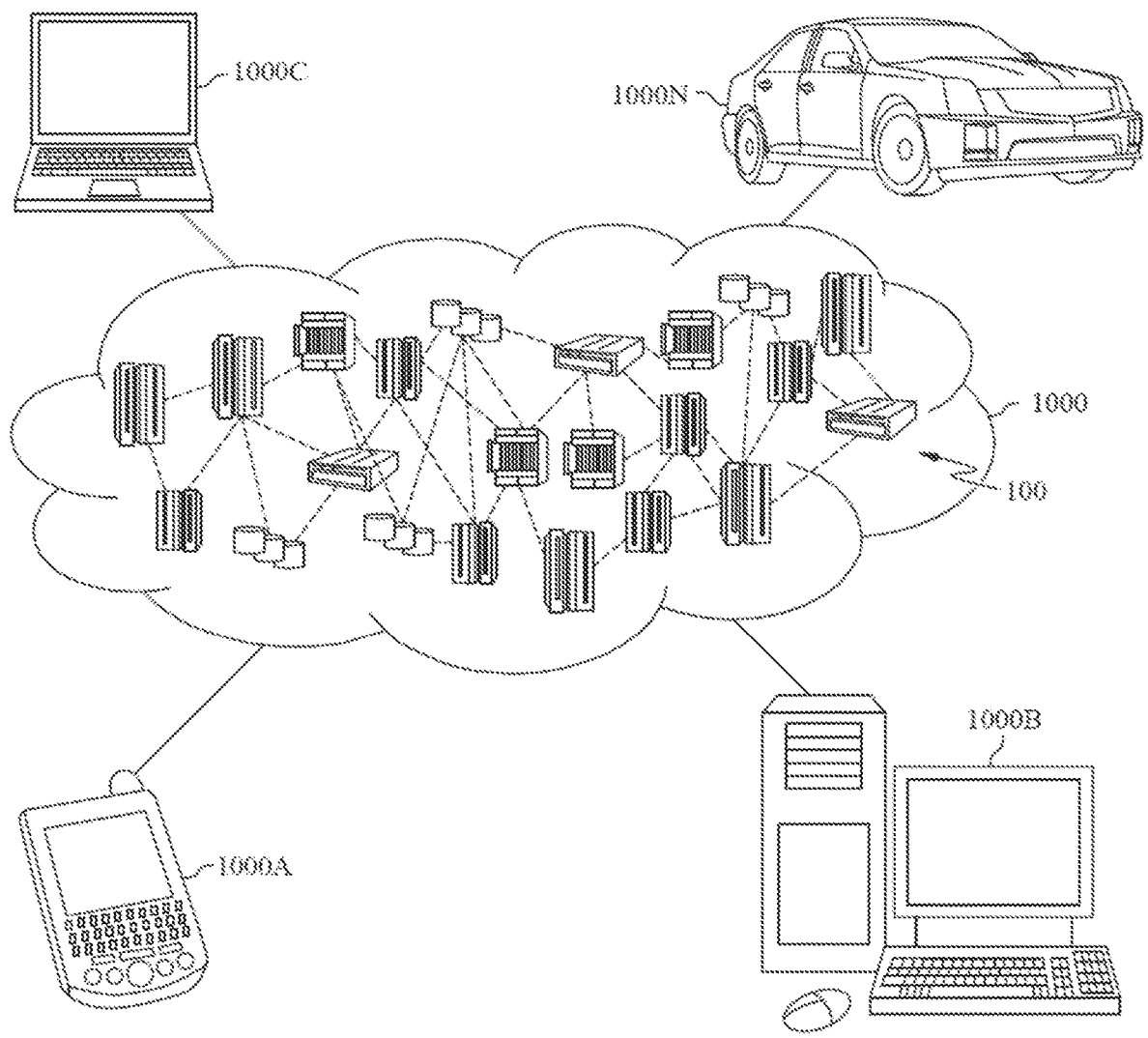
FIG. 6 is a block diagram of an illustrative cloud computing environment including the remote device and the natural language processing system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
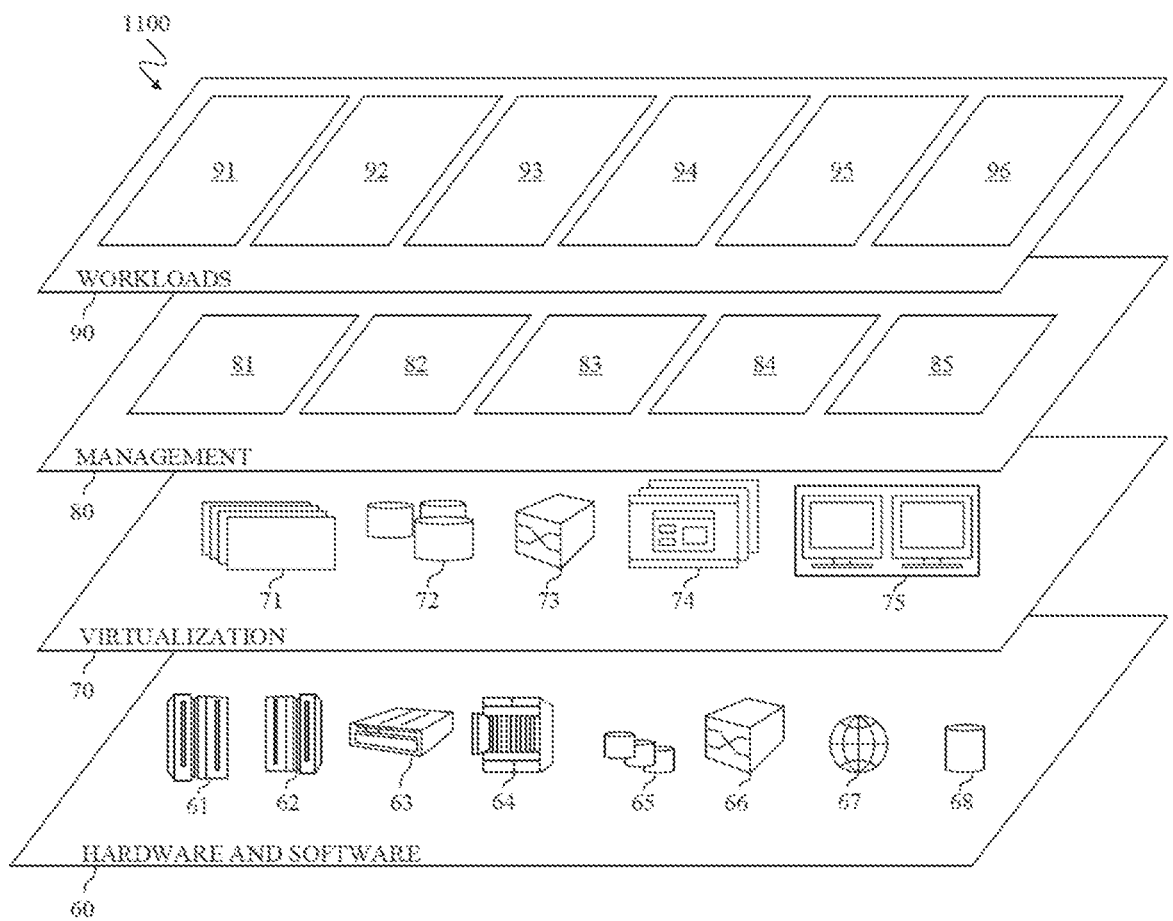
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic translation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamically utilizing natural language processing to display real-time translations, the method comprising:

ingesting, by a natural language processor, user information;

finding, by the natural language processor, one or more trigger words in the user information, comprising:
  determining one or more user information entities through parsing the user information;
  finding one or more first concepts within a respective portion of the one or more user information entities;
  establishing a relevance of each user information entity;
  establishing, subject to the established user information entity relevance, one or more of the first concepts as one or more trigger words; and
  storing the established trigger words;

receiving, by utilizing one or more sensors to monitor audio, monitored audio of a surrounding environment within a predetermined proximity of a user;

transcribing the monitored audio into a textual format;

parsing, by a natural language processor, the transcribed text;

identifying, based on the parsing of the transcribed text, one or more of the trigger words within the transcribed text;

determining, by the natural language processor, a context of the one or more trigger words within the transcribed text, comprising:

finding one or more of second concepts and the first concepts within a respective portion of the one or more transcribed text entities;

determining one or more of the first concepts and the second concepts surrounding the identified trigger words; and establishing, subject to the concepts determination, a context of the identified one or more trigger words;

determining that the context of the identified one or more trigger words satisfies a predetermined user criteria; and translating, in real-time, at least a portion of the monitored audio.

2. The method of claim 1, wherein:

the user information is ingested from one or more forms of electronic communication within a social networking system;

establishing a relevance of each user information entity comprises detecting correlations and linguistic links between the one or more user information entities; and the method further comprises:

displaying, within a user interface, a notification to the user that includes a short summary describing the context and an option to view a translation of the monitored audio;

receiving a user selection to translate the monitored audio; and displaying the translation within the user interface.

3. The method of claim 1, wherein monitoring the audio of the surrounding environment is performed by a plurality of audio recording devices embedded within an electronic device, the method further comprising:

recording, by the plurality of microphones, audio within the predetermined proximity of the user;

determining, by analyzing the recorded audio from the plurality of microphones; a geographic location of a source of the monitored audio, relative to the user, wherein the geographic location of the source is an indication of confidence of the trigger word and the context of the trigger word;

prompting, within a user interface, an option to view the geographic location of the source;

receiving, from the user, the option to view the geographic location; and displaying, within the user interface, the geographic location.

4. The method of claim 2, further comprising:

continuing to display the translation within the user interface;

receiving, from the user, a request to terminate the display of the translation; and terminating the display of the translation.

5. The method of claim 3, further comprising:

receiving a request from the user to store the translation within a data corpus;

storing the translation within the data corpus; and determining, based on the monitored audio, that a distance from the user and a source of the monitored audio satisfies a threshold.

6. The method of claim 1, wherein the determining that the context satisfies the predetermined user criteria further comprises:

generating a knowledge graph based on the transcribed text, wherein the knowledge graph includes a first plurality of concept nodes representing a first plurality of content and a second plurality of concept nodes representing a second plurality of content, wherein edges between the first plurality of concept nodes and the second plurality of concept nodes represent links between the first plurality of content and the second plurality of content; and calculating a uniqueness score that is a numerical value for each concept node in the second plurality of concept nodes based on a number of edges between the first plurality of concept nodes and the second plurality of concept nodes, thereby determining a relatedness between the first plurality of concept nodes and the second plurality of concept nodes, and further according to the predetermined user criteria, wherein the first plurality of concept nodes is the transcribed text and the second plurality of concept nodes is the one or more trigger words.

7. The method of claim 6, wherein the predetermined user criteria are selected from a group consisting of a number of trigger words within the transcribed text, a weight of each trigger word, and a distance from the user to a source of the monitored audio.

8. A computer system for dynamically utilizing natural language processing to display real-time translations, a method comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing the method comprising:

ingesting, by a natural language processor, user information;

finding, by the natural language processor, one or more trigger words in the user information, comprising:

determining one or more user information entities through parsing the user information;

finding one or more first concepts within a respective portion of the one or more user information entities;

establishing a relevance of each user information entity;

establishing, subject to the established user information entity relevance, one or more of the first concepts as one or more trigger words; and storing the established trigger words;

receiving, by utilizing one or more sensors to monitor audio, monitored audio of a surrounding environment within a predetermined proximity of a user;

transcribing the monitored audio into a textual format;

parsing, by a natural language processor, the transcribed text;

identifying, based on the parsing of the transcribed text, one or more of the trigger words within the transcribed text;

determining, by the natural language processor, a context of the one or more trigger words within the transcribed text, comprising:

finding one or more of second concepts and the first concepts within a respective portion of the one or more transcribed text entities;

determining one or more of the first concepts and the second concepts surrounding the identified trigger words; and establishing, subject to the concepts determination, a context of the identified one or more trigger words;

determining that the context of the identified one or more trigger words satisfies a predetermined user criteria; and translating, in real-time, at least a portion of the monitored audio.

9. The computer system of claim 8, wherein:

the user information is ingested from one or more forms of electronic communication within a social networking system;

establishing a relevance of each user information entity comprises detecting correlations and linguistic links between the one or more user information entities; and the method further comprises:

displaying, within a user interface, a notification to the user that includes a short summary describing the context and an option to view a translation of the monitored audio;

receiving a user selection to translate the monitored audio; and displaying the translation within the user interface.

10. The computer system of claim 8, wherein monitoring the audio of the surrounding environment is performed by a plurality of audio recording devices embedded within an electronic device, the method further comprising:

recording, by the plurality of microphones, audio within the predetermined proximity of the user;

determining, by analyzing the recorded audio from the plurality of microphones; a geographic location of a source of the monitored audio, relative to the user, wherein the geographic location of the source is an indication of confidence of the trigger word and the context of the trigger word;

prompting, within a user interface, an option to view the geographic location of the source;

receiving, from the user, the option to view the geographic location; and displaying, within the user interface, the geographic location.

11. The computer system of claim 9, the method further comprising:

continuing to display the translation within the user interface;

receiving, from the user, a request to terminate the display of the translation; and terminating the display of the translation.

12. The computer system of claim 10, the method further comprising:

receiving a request from the user to store the translation within a data corpus;

storing the translation within the data corpus; and determining, based on the monitored audio, that a distance from the user and a source of the monitored audio satisfies a threshold.

13. The computer system of claim 8, wherein the determining that the context satisfies the predetermined user criteria further comprises:

generating a knowledge graph based on the transcribed text, wherein the knowledge graph includes a first plurality of concept nodes representing a first plurality of content and a second plurality of concept nodes representing a second plurality of content, wherein edges between the first plurality of concept nodes and the second plurality of concept nodes represent links between the first plurality of content and the second plurality of content; and calculating a uniqueness score that is a numerical value for each concept node in the second plurality of concept nodes based on a number of edges between the first plurality of concept nodes and the second plurality of concept nodes, thereby determining a relatedness between the first plurality of concept nodes and the second plurality of concept nodes, and further according to the predetermined user criteria, wherein the first plurality of concept nodes is the transcribed text and the second plurality of concept nodes is the one or more trigger words.

14. The computer system of claim 13, wherein the predetermined user criteria are selected from a group consisting of a number of trigger words within the transcribed text, a weight of each trigger word, and a distance from the user to a source of the monitored audio.

15. A computer program product for dynamically utilizing natural language processing to display real-time translations, the computer program product comprising:

one or more computer-readable storage medium and program instructions stored on at least one of the one or more tangible storage medium, the program instructions executable by a processor, the program instructions executable by a computer to perform a method comprising:

ingesting, by a natural language processor, user information;

finding, by the natural language processor, one or more trigger words in the user information, comprising:

determining one or more user information entities through parsing the user information;

finding one or more first concepts within a respective portion of the one or more user information entities;

establishing a relevance of each user information entity;

establishing, subject to the established user information entity relevance, one or more of the first concepts as one or more trigger words; and storing the established trigger words;

receiving, by utilizing one or more sensors to monitor audio, monitored audio of a surrounding environment within a predetermined proximity of a user;

transcribing the monitored audio into a textual format;

parsing, by a natural language processor, the transcribed text;

identifying, based on the natural language processor parsing the transcribed text, one or more trigger words within the transcribed text;

determining, by the natural language processor, a context of the one or more trigger words within the transcribed text, comprising:

finding one or more of second concepts and the first concepts within a respective portion of the one or more transcribed text entities;

determining one or more of the first concepts and the second concepts surrounding the identified trigger words; and establishing, subject to the concepts determination, a context of the identified one or more trigger words;

determining that the context of the identified one or more trigger words satisfies a predetermined user criteria; and translating, in real-time, at least a portion of the monitored audio.

16. The computer program product of claim 15, wherein:
the user information is ingested from one or more forms of electronic communication within a social networking system;
establishing a relevance of each user information entity comprises detecting correlations and linguistic links between the one or more user information entities; and
the method further comprises:
  displaying, within a user interface, a notification to the user that includes a short summary describing the context and an option to view a translation of the monitored audio;
  receiving a user selection to translate the monitored audio; and
  displaying the translation within the user interface.

17. The computer program product of claim 15, wherein monitoring the audio of the surrounding environment is performed by a plurality of audio recording devices embedded within an electronic device, the method further comprising:
  recording, by the plurality of microphones, audio within the predetermined proximity of the user;
  determining, by analyzing the recorded audio from the plurality of microphones; a geographic location of a source of the monitored audio, relative to the user, wherein the geographic location of the source is an indication of confidence of the trigger word and the context of the trigger word;
  prompting, within a user interface, an option to view the geographic location of the source;
  receiving, from the user, the option to view the geographic location; and
  displaying, within the user interface, the geographic location.

18. The computer program product of claim 16, the method further comprising:
  continuing to display the translation within the user interface;
  receiving, from the user, a request to terminate the display of the translation; and
  terminating the display of the translation.

19. The computer program product of claim 17, the method further comprising:
  receiving a request from the user to store the translation within a data corpus;
  storing the translation within the data corpus; and
  determining, based on the monitored audio, that a distance from the user and a source of the monitored audio satisfies a threshold.

20. The computer program product of claim 15, wherein the determining that the context satisfies the predetermined user criteria further comprises:
  generating a knowledge graph based on the transcribed text, wherein the knowledge graph includes a first plurality of concept nodes representing a first plurality of content and a second plurality of concept nodes representing a second plurality of content, wherein edges between the first plurality of concept nodes and the second plurality of concept nodes represent links between the first plurality of content and the second plurality of content; and
  calculating a uniqueness score that is a numerical value for each concept node in the second plurality of concept nodes based on a number of edges between the first plurality of concept nodes and the second plurality of concept nodes, thereby determining a relatedness between the first plurality of concept nodes and the second plurality of concept nodes, and further according to the predetermined user criteria, wherein the first plurality of concept nodes is the transcribed text and the second plurality of concept nodes is the one or more trigger words.

* * * * *